Figure 1:
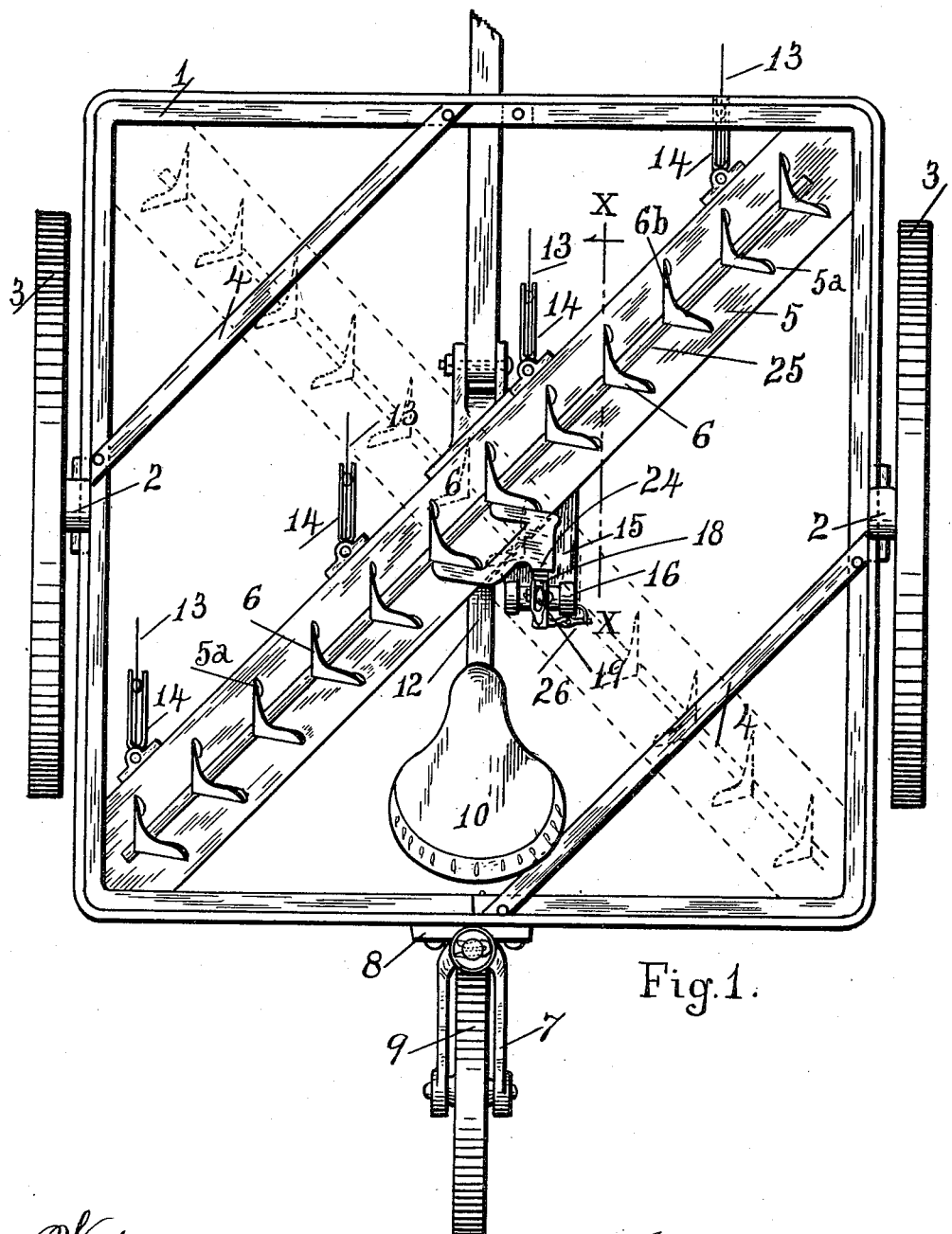

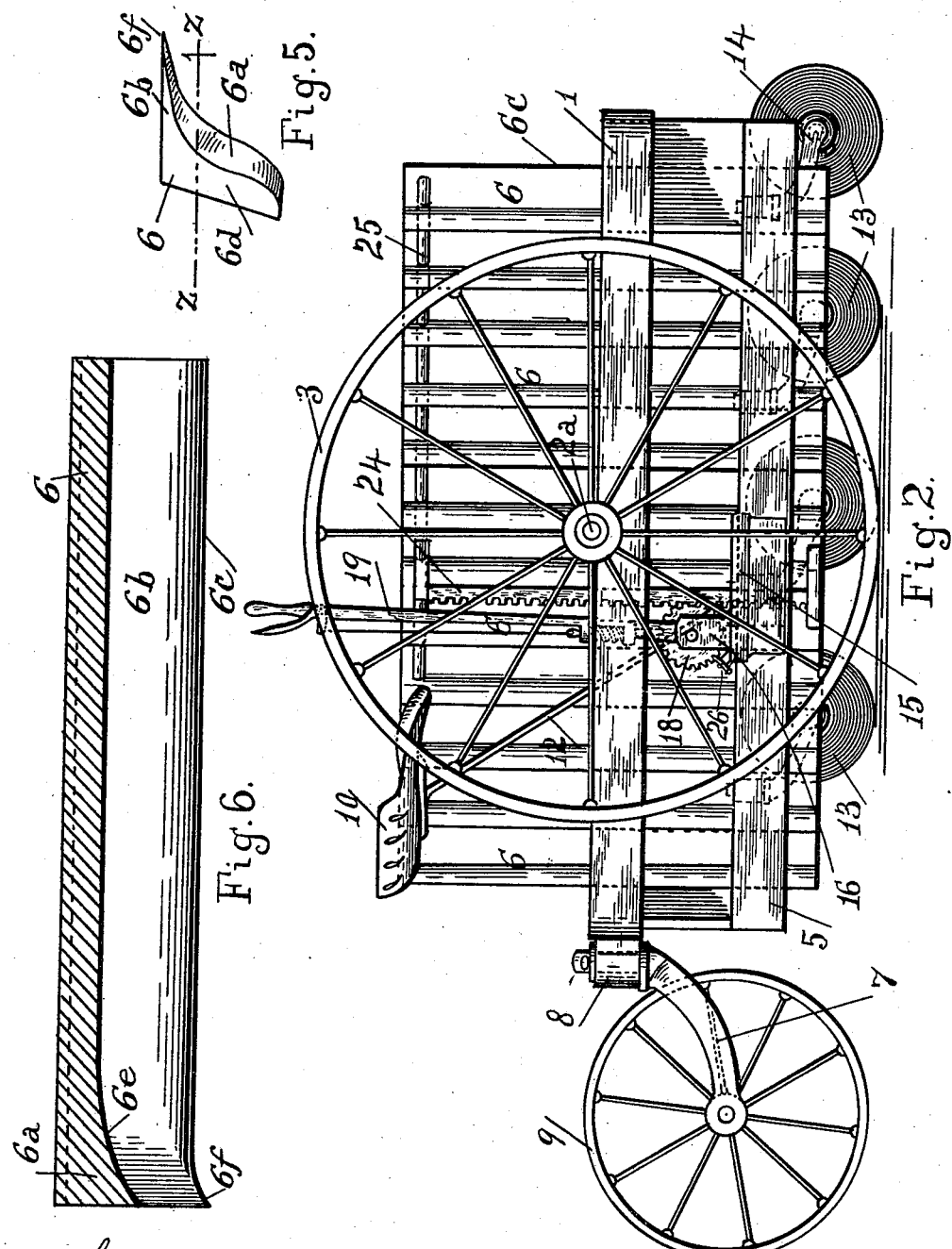

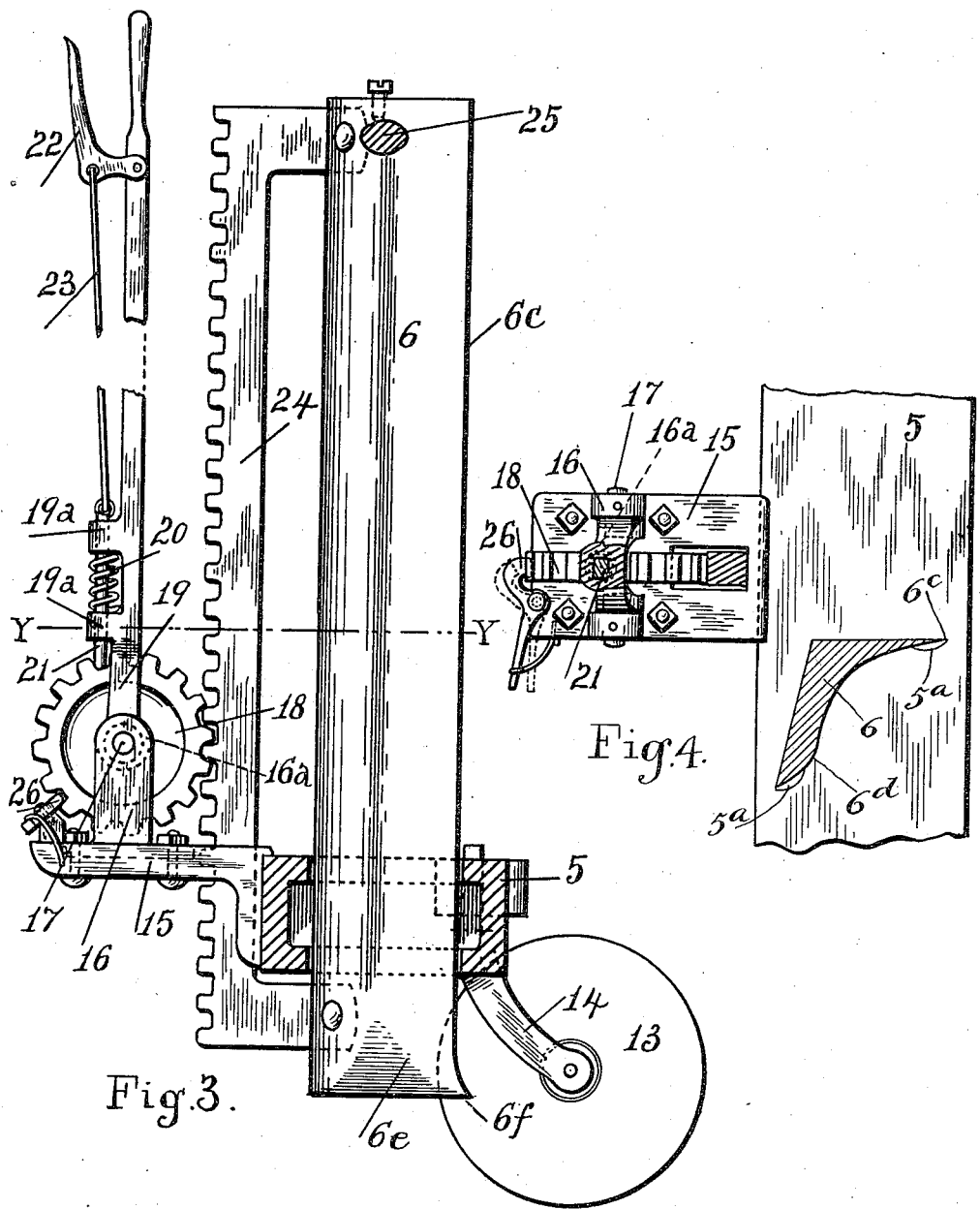

UNITED STATES PATENT OFFICE.

JAMES W. SOUTHWICK, OF SPRINGFIELD, ILLINOIS.

PLOW.

1,031,594.  Specification of Letters Patent.  Patented July 2, 1912.

Application filed August 6, 1910. Serial No. 575,995.

*To all whom it may concern:*

Be it known that I, JAMES W. SOUTH-WICK, a citizen of the United States, residing at Springfield, in the county of Sangamon and State of Illinois, have invented a certain new and useful Improvement in Plows, of which the following is such a full, clear, and exact description as will enable others skilled in the art to make and use my said invention.

This invention relates to plows for deep plowing, adapted to penetrate and slice the soil to the depth to which it is to be plowed and move the slices laterally without turning over the soil; and pulverize the slices during the lateral movement thereof.

Prior to my invention the practice has been to cut a furrow ten or twelve inches in width and two or more inches in depth, and by means of the mold board of the plow, turn over and pulverize the cut. This practice is unsatisfactory, because in dry weather the heat of the sun quickly dries out the shallow turned cut and the soil becomes parched; or if the season is wet, the shallow cut will become water-soaked. In either case the conditions will be very unfavorable to the proper growth of vegetation.

My invention contemplates cutting the soil into deep slices and then sliding the slices laterally and pulverizing them without turning over the surface soil. The practical advantages of this mode of tillage are: The cuts are in relatively thin vertical slices which are thoroughly pulverized, and there are, therefore, no clods; the deep tillage affords good drainage so that the soil does not become water-soaked; and the deeply broken soil permits the roots of vegetation to extend well down into the soil so that the crop will not suffer from the drouth.

I have illustrated the invention as applied to a riding plow, it is, however, applicable to walking plows.

The purposes of the invention are to provide a blade of improved form, adapted to cut deeply into the soil to divide it into vertical slices and coincidently with the cutting to move laterally the slices of earth which are being cut by the blade, and also adapted to lift somewhat the cut slices; to provide means adapted to support a plurality of blades operating jointly; to provide means for adjusting the depth of cut and holding the blades in the different positions in which they may be set, and to provide other new and useful features of construction, as will hereinafter more fully appear.

The invention is embodied in an apparatus shown in the annexed drawings to which reference is hereby made, and is hereinafter particularly described and finally recited in the claims.

Figure 1 is a top plan of a riding plow embodying my invention; Fig. 2 is a right-hand side elevation of the plow; Fig. 3 is an enlarged vertical section on the line X. X. of Fig. 1; Fig. 4 is a horizontal section on the line Y. Y. of Fig. 3; Fig. 5 is an enlarged top plan of one of the plow blades, and Fig. 6 is a vertical section on the line Z. Z. of Fig. 5.

The main frame 1 is preferably of steel T rail, bent as shown. Blocks 2 secured on the sides of the frame 1 have spindles $2^a$. The supporting wheels 3 turn on the spindles $2^a$. Diagonal braces 4 strengthen the frame. The blade support 5, which is preferably cast in one piece, extends diagonally across and is securely connected with the frame 1.

The angular elongated blades 6, which will be hereinafter more fully described, are adapted to slide vertically in holes $5^a$ through the blade support 5. The vertical blades 6 are arranged in a series diagonal to the line of draft of the plow. The transverse distance between any two adjacent blades is equal to, or slightly greater than the width of a blade, and after the first or leading blade of the series, each blade is behind the next preceding blade a distance equal to or slightly greater than the width of a blade and this relative position of the blades affords full clearance for the width of cut of all the blades and reduces friction and prevents clogging of the slices between the blades. The blades are preferably about two inches wide, but blades of other width may be used without departure from my invention.

In a right-hand plow the diagonal line in which the blades are arranged, extends forwardly to the right and rearwardly to the left of the line of draft of the plow, and the right-hand blade is in the lead. In a left-hand plow the diagonal line in which the blades are arranged extends forwardly to the left and rearwardly to the right, and the left-hand blade is in the lead, as indicated by dotted lines in Fig. 1.

The blades are in such relation to each other that in a right-hand plow, such as is shown in the drawings, the right-hand blade will make the first cut and will slide to the right the slice which it cuts, so as to leave between the slice and the body of the land a space equal to the width of the blade; the second blade, to the left and in the rear of the first blade will cut the second slice and slide it to the right in the wake of the first blade; the third blade, to the left and in the rear of the second blade, will cut the third slice and slide it to the right in the wake of the second blade, and so on for all the other blades. If the plow is a left-hand plow, the leading or left-hand blade will cut the first slice and slide it to the left; the second blade will cut the second slice and slide it to the left in the wake of the first blade, and so on for all the other blades from left to right.

The yoke 7 is swiveled in a block 8, secured centrally on the rear end of the frame 1. A tiller wheel 9 is mounted to turn in the yoke 7 and supports the rear end of the frame. A seat 10 is mounted on a standard 12, secured on the blade-support 5.

Colters 13 are mounted to rotate in yokes 14 suitably connected with the front of the blade-support 5. The colters are intended merely to cut stalks or trash into short lengths which will not interfere with the operation of the plow blades. Inasmuch as the cuts of stalks or trash are not turned under, the alinement of the colter blades with the plow blades is not essential.

A horizontal bracket 15 is secured on and extends rearwardly from the blade-support 5. Parallel vertical standards 16 are secured on the bracket 15 and have integral inwardly extending hubs 16$^a$. The shaft 17 extends through and is secured on the standards 16. A toothed wheel 18 is mounted to rotate on the shaft 17. A forked lever 19 is mounted to oscillate on the hubs 16$^a$ of the standards 16.

A spring 20 occupies the space between the rearwardly extending lugs 19$^a$ on the lever 19. A latch 21 extends through the lugs 19$^a$ and the spring 20 and the lower end of the latch enters the spaces between the teeth of the wheel 18, so that when the latch is in engagement with the wheel, forward movement of the upper end of the lever will cause the wheel to rotate clock-wise, and rearward movement of the lever will cause the wheel to rotate counter-clock-wise. A grip lever 22 is pivotally connected with the lever 19. A rod 23 connects the latch 21 and the grip lever 22, so that when the lever 22 is gripped, the rod will pull on the latch 21 to raise the latch and disengage it from the wheel 18. A vertical rack-bar 24 is connected with two of the blades 6 above and below the blade-support 5, as clearly shown in Figs. 1 and 3. The teeth of the bar 24 mesh with the teeth of the wheel 18 so that the clock-wise rotation of the wheel will cause the blades 6 to slide downward and counter-clock-wise rotation of the wheel will cause the blades to slide upward.

A horizontal rod 25 extends through all the blades and connects them so that they will move in unison upward or downward. The lever 19 may be operated to raise or lower the blades to any extent within the scope of the rack-bar 24.

A pawl 26 mounted on the bracket 15 is adapted to engage the wheel 18 to prevent rotation of the wheel, and is operable by the foot of the driver, to hold the wheel in any position in which it may be set.

All the blades are exactly alike, so a description of one will suffice for all. The blade 6 is a steel bar somewhat thicker at its lower end 6$^a$ than it is at its upper end, and the cross section of the blade is approximately a triangle having one obtuse angle. The cutting member 6$^b$ is parallel to the line of travel of the blade and is drawn to form a knife edge 6$^c$ extending the length of the blade. The member 6$^d$ (Fig. 5) is substantially of the contour shown and is adapted to push laterally the deep slice of dirt cut off by the knife edge 6$^c$. The part 6$^a$ inclines upwardly as shown at 6$^e$ and merges into the body of the blade. As the blade progresses, the inclined surface 6$^e$ acts to lift from the bottom upward, to a limited extent, the slice of soil which is cut by the knife edge 6$^c$. It will be seen, therefore, that there is a slight upward movement of the cut slice as well as a lateral movement of the slice, and the effect of these combined movements is to pulverize the slice of soil. At the lower end of the blade is an integral plow point 6$^f$, which coöperates with the inclined surface 6$^e$ to cause the blade to enter the ground. The depth of tillage may be varied according to the depth at which the blade runs.

In practice a furrow of the desired depth may at the outset be plowed around the land by means of an ordinary breaking plow.

In operating the improved slicing plow herein set forth, the first cuts will be made beginning with the cross furrow at one end of the land and running to the cross furrow at the other end of the land; thence along the furrow at the other end of the land, thence along the side furrow to the first end of the land, and thence along the furrow across the first end of the land to the place of beginning; and so on; and at each round the plow will cut off a number of vertical slices equal to the number of blades of the plow.

Another mode of operation is to set the blades for a shallow cut, say two inches deep for the first round, then lower the blades to cut, say four inches deep for the second round, and so on for a succession of rounds, until the desired maximum depth of cut is attained; and thereafter the plow will be operated to cut the maximum depth.

In the drawings I have illustrated twelve blades adapted to cut twelve two-inch slices, but the plow may be made with a greater or less number of blades, to cut a greater or less number of slices.

Having fully described my invention, what I claim as new, and desire to secure by Letters Patent is:

1. A blade for deep cutting having a vertical knife edge lengthwise of the blade and adapted to slice soil, and a lateral member lengthwise the blade and adapted to move laterally, without turning over the surface soil, the slice of soil cut by the knife edge of the blade.

2. A blade having a vertical knife edge lengthwise of the blade and adapted to slice soil, also having adjacent to its lower end an inclined surface adapted to raise the slice of soil and also having a curved lateral member lengthwise of the blade adapted to move laterally, without turning over the surface soil, the slice of soil cut by the knife edge of the blade and raised by the inclined surface of the blade.

3. The combination of a propellable vehicle, a blade mounted on the vehicle and having a vertical knife edge lengthwise of the blade and adapted to slice soil during the progress of the vehicle, also having a curved lateral member lengthwise of the blade and adapted to move laterally the slice of soil cut by the knife edge of said blade.

4. The combination of a propellable vehicle, a blade mounted on the vehicle and having a vertical knife edge lengthwise of the blade and adapted to slice soil during the progress of the vehicle, also having a curved lateral member lengthwise of the blade and adapted to move laterally the slice of soil cut by the knife edge of the blade, and means for adjusting the blade vertically to vary the depth of cut.

5. A plow comprising a plurality of vertical angular blades of equal width separated by spaces equal to or slightly greater than the width of a blade and arranged in a series diagonal to the line of draft of the plow, each blade having a lengthwise knife edge adapted to cut the soil into deep vertical slices, and a lengthwise member adapted to move laterally, without turning over the soil, the slice cut by said blade and to deposit said slice in the wake of the blade making the next preceding cut.

6. In a plow, the combination of a main frame, supporting wheels, a blade-support diagonal to the main frame, and angular vertical blades mounted on said blade-support and having lengthwise cutting edges adapted to cut the soil into relatively deep slices parallel to the line of draft of the plow, and vertical members adapted to slide said slices laterally.

In witness whereof, I have hereunto signed my name at Springfield, Illinois, this 20th day of June, 1910.

JAMES W. SOUTHWICK.

Witnesses:
  W. S. TROXELL,
  S. H. GEHLMAN.

---

Copies of this patent may be obtained for five cents each, by addressing the "Commissioner of Patents, Washington, D. C."